J. G. PERRY.
TOBACCO CUTTER.
No. 181,361. Patented Aug. 22, 1876.
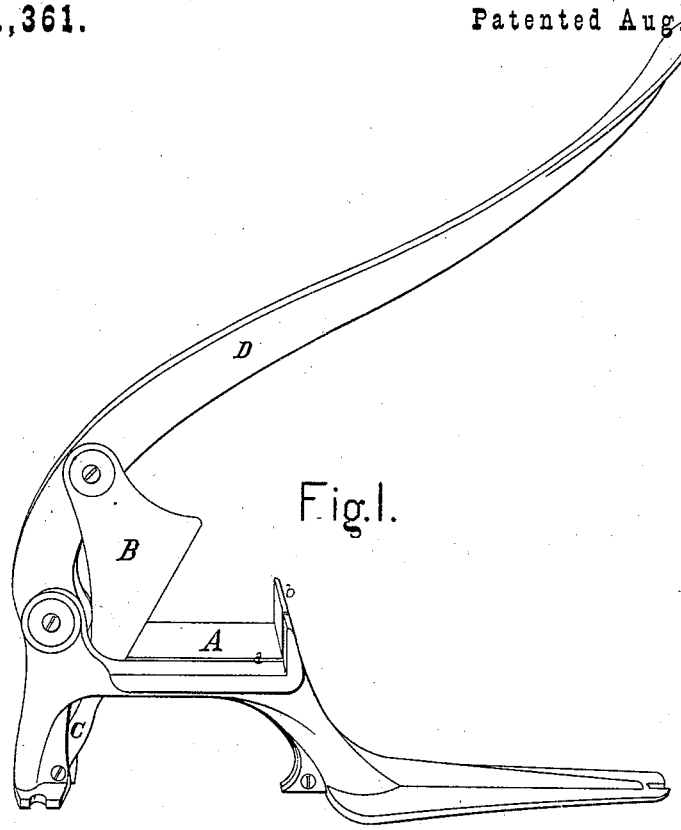
Fig.1.
Fig.2.
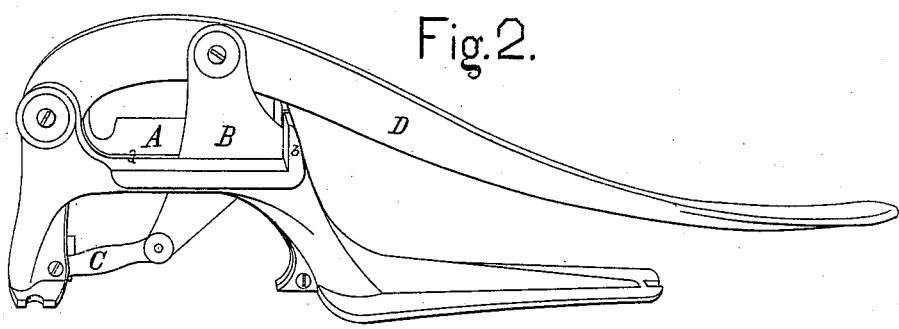
WITNESSES.      INVENTOR.

UNITED STATES PATENT OFFICE.

JOHN G. PERRY, OF KINGSTON, RHODE ISLAND.

IMPROVEMENT IN TOBACCO-CUTTERS.

Specification forming part of Letters Patent No. 181,361, dated August 22, 1876; application filed February 17, 1876.

*To all whom it may concern:*

Be it known that I, JOHN G. PERRY, of Kingston, in the county of Washington and State of Rhode Island, have invented certain Improvements in Tobacco-Cutters, applicable also to bread and meat slicers, feed-cutters, &c., of which the following is a specification:

This invention consists in an improved open or slotted frame, so that the edge of the knife can pass entirely through the same; also in combining with the frame the operating lever and link pivoted thereto, and operating parallel, or nearly so, to each other, with the blade pivoted one end to said operating-lever, and the other end to said link, producing a new and novel mechanical movement.

In the drawings accompanying this specification, and making part thereof, Figure 1 is a perspective elevation, showing the machine open at the commencement of the stroke. Fig. 2 is a perspective elevation, showing the machine at the completion of the stroke, with operating-lever resting on the projection $b$.

A is the frame, preferably formed in two longitudinal halves, between which, in suitable recesses, is pivoted one end of the operating-lever D and one end of the connecting-link C. The pivots upon which the lever and link move form also rivets to connect these parts of the frame together. Other rivets for riveting the frame will be used as desired. B is the cutter, working in the opening or slot $a$ between the two halves of the frame, and is pivoted to the operating-lever D and the link C, as shown in Figs. 1 and 2, so as to give the blade a new and peculiar drawing stroke when brought from the position shown in Fig. 1 to that of Fig. 2. The bed-piece or hopper is elevated above the feet or base of the machine, so that the knife may pass through the opening or slot in the frame below the tobacco or material cut without coming in contact with the counter, or that on which the machine stands.

The feet and base are broad and long, so that the machine may stand firmly. The material to be cut is retained in position to be operated upon by the projection $b$, adjoining the bed-piece, hopper, and frame, and against which the lever bears when the stroke is completed.

The machines shown in the annexed drawings are designed especially for cutting tobacco. To adapt them to the slicing of bread and meat, or cutting other matters, would require some obvious changes in the size, shape, and proportions of the parts, but no material alteration in the principle will be necessary. The bed-piece or hopper may be provided with a suitable gage to regulate the cut. The knives in other machines enter the broad side of the tobacco, and pass through to the other, striking their edges directly against a strip of metal or material, having a tendency to dull them. This device not only makes a new and novel drawing cut, but the blade enters at one edge of the tobacco and finishes at the other, so as to cut very easily, and strikes its edge against nothing to dull it. It opens wide for sharpening, feeding in the tobacco, &c.; and the blade passing through the slot $a$ in the frame, and close to the sides thereof, makes it self-cleaning, and the machine is simple, durable, and cheap.

Having thus described my invention, I claim—

1. The blade B, link C, and operating-lever D pivoted to each other and the frame A, substantially as set forth.

2. The frame A, having the opening $a$ and projection $b$, in combination with the lever D, link C, and blade B, substantially as and for the purposes set forth.

JOHN G. PERRY.

Witnesses:
S. EMMA PERRY,
HOWARD B. PERRY.